Patented July 29, 1952

2,605,289

UNITED STATES PATENT OFFICE 2,605,289

PREPARING AROMATIC MERCAPTANS

George H. Daniels and John J. Verbanc, Wilmington, Del., assignors to E. I. du Pont de Nemours & Company, Wilmington, Del., a corporation of Delaware No Drawing. Application February 9, 1950, Serial No. 143,356

12 Claims. (Cl. 260—609)

1

This invention relates to a method for preparing methyl substituted aromatic mercaptans, particularly from their corresponding polysulfides.

The most common method, which has been employed in the past for preparing aromatic mercaptans, comprises reacting an aromatic hydrocarbon with chlorosulfonic acid to form an aryl sulfonyl chloride and reducing the aryl sulfonyl chloride by treatment with zinc dust and an aqueous acid, such as hydrochloric acid. The aromatic mercaptans, produced by such process, are expensive, due primarily to the large amount of zinc dust required.

More recently, a method has been developed for making aryl mercaptans at a substantially lower cost than by the above chlorosulfonic acid process. Such latter method comprises condensing an aromatic hydrocarbon with sulfur monochloride to produce a mixture of aromatic sulfides composed primarily of aromatic polysulfides as described by Signaigo in Patent 2,402,685, then reducing such crude mixture, preferably, with an alkali sulfide in aqueous caustic solution, and then acidifying the reduced mixture to liberate the free mercaptan. Such mixture of aromatic polysulfides can also be reduced to the corresponding mercaptans by catalytic hydrogenation or by treatment with agents, such as zinc dust and an aqueous acid, hydrogen sulfide, an alkali amalgam, metallic sodium, etc.

It is an object of our invention to provide a method for preparing methyl substituted phenyl mercaptans at lower cost than the methods previously employed or suggested. Another object is to provide a novel method for preparing methyl substituted phenyl mercaptans from the corresponding di-(methyl substituted phenyl) polysulfides. A further object is to provide a method for preparing methyl substituted phenyl mercaptans in high yields by the pyrolysis of the corresponding di-(methyl substituted phenyl) polysulfides. Other objects are to advance the art. Still other objects will appear hereinafter.

The above and other objects of our invention may be accomplished by heating at least one di-(methyl substituted phenyl) polysulfide at a temperature of from 200° C. to 350° C. under a pressure below 150 mm. of mercury absolute, and removing the mercaptans from the reaction mass. By such method, the polysulfides are converted to the corresponding methyl substituted phenyl mercaptans economically and in good yields. Such process is simple and easy to operate and control.

The term "phenyl" is employed in its commonly

2 understood sense to mean the monovalent radical theoretically derived by the removal of one hydrogen atom from benzene. The term "methyl substituted phenyl" refers to a phenyl radical in which from 1 to 5 hydrogen atoms have been replaced by methyl groups only. A "di-(methyl substituted phenyl) polysulfide" or "disulfide" refers to those compounds in which 2 methyl substituted phenyl radicals are joined together by 2 or more sulfur atoms, each methyl substituted phenyl radical being bonded directly to a different sulfur atom.

The di-(methyl substituted phenyl) polysulfides, which are to be employed in our method, are those which contain from 1 to 5 methyl groups, such as ditolyl polysulfides, dixylyl polysulfides, mesitylene polysulfides, durene polysulfides, etc. Our process is particularly adapted to the treatment of such polysulfides in which each phenyl radical contains only 1 to 2 methyl radicals, i. e., the ditolyl polysulfides and the dixylyl polysulfides. Also, our process is particularly adapted to the treatment of the disulfides. The di-(methyl substituted phenyl) polysulfides may be single pure compounds, mixtures of two or more of such polysulfides, or crude reaction mixtures such as are obtained in the manufacture of the polysulfides. The di-(methyl substituted phenyl) polysulfides may be made by any of the known methods, such as the oxidation of the corresponding mercaptans.

Particularly valuable sources of the di-(methyl substituted phenyl) polysulfides are the crude reaction products obtained by condensing the corresponding aromatic hydrocarbon with sulfur monochloride as described by Signaigo in Patent 2,402,685. For example, dixylyl polysulfides may be made in this manner from 3° xylene, which is a mixture of ortho, meta and para xylenes. When such products are made, employing a 10 to 1 mol ratio of hydrocarbon to sulfur monochloride, the crude solvent-free mixture contains about 70 weight percent of polysulfides reducible to the aromatic mercaptan by treatment with zinc dust and acid, the remaining 30 weight percent being composed primarily of monosulfides. While it is unnecessary to remove the inert solvents or the by-products of the condensation reaction from such crude reaction products, prior to treating them by the process of our invention, it will generally be preferred to remove the solvents before so treating them.

The temperatures to be employed in our method may range from 200° C. to about 350° C. At temperatures below 200° C., little or no conversion to mercaptan takes place even at pressures as low as 1 mm. of mercury absolute. At temperatures substantially above 350° C., the conversion to mercaptan is too small to be of practical value. Optimum conversion to mercaptan is obtained at temperatures between 200° C. and 300° C. and such temperatures are preferred. Such preferred temperatures also result in the purest products.

In order to obtain economically high yields of mercaptan, the pressures employed should be below 150 mm. of mercury absolute. As the pressure is increased above 150 mm., the conversion and purity of the products rapidly decreases, the conversions decreasing from at least 40% at pressures below 150 mm. to about 12% at atmospheric pressure. Optimum conversions and purest products are obtained at pressures below 100 mm. of mercury absolute and particularly at pressures below 50 mm.

While it is not necessary to remove the mercaptans from the reaction mass and reaction zone as rapidly as they are generated, optimum yields are obtained if the mercaptans are removed from the reaction mixture continuously during the reaction and substantially as rapidly as they are generated.

In order to more clearly illustrate our invention, suitable modes of carrying the same into effect and the advantageous results to be obtained thereby, the following examples are given:

EXAMPLE 1

Di-para-tolyl disulfide was prepared by the oxidation of the sodium salt of para-thiocresol with hydrogen peroxide. About 100 grams of the di-para-tolyl disulfide was placed in a 0.5 liter round-bottom flask equipped with a 30 x 1 inch vacuum-jacketed fractionating column packed with glass helices. An appropriate distillation head and receiver surmounted the column. The pressure in the system was reduced to 1-2 mm. of mercury absolute and the flask contents were heated to 235–250° C. Under these conditions, substantially pure para-thiocresol distilled continuously until the reaction was complete after about 2 hours. About 44% of the di-para-tolyl disulfide was converted to pure para-thiocresol.

EXAMPLE 2

Mixtures of dixylyl disulfides were prepared by the hydrogen peroxide oxidation of the sodium salts of a mixture of isomeric xylyl mercaptans which had been made by the chlorosulfonic acid process from 3° xylene (a mixture of ortho, meta and para xylenes). Samples of such mixtures were converted to pure xylyl mercaptans by treatment in the apparatus of Example 1 at various temperatures and pressures with the results shown in the following Table I:

Table I

| Sample | Reaction Temperature 0° C. | Absolute Pressure Mm. Hg | Conversion to Xylyl Mercaptan percent |
|---|---|---|---|
| 1 | 200–235 | 1 | 55 |
| 2 | 233–284 | 2–4 | 58 |

EXAMPLE 3

A solvent-free sample of the crude reaction product, obtained by condensing 3° xylene with sulfur monochloride in a 10 to 1 mol ratio, was treated in the apparatus of Example 1. This sample was a mixture of xylyl sulfides, including some dixylyl monosulfide as well as dixylyl disulfides and higher sulfides. The pressure in the system was reduced to 2–5 mm. of mercury absolute and the flask contents were heated to 225–250° C. About 52% of the xylyl polysulfides were converted to pure xylyl mercaptans.

When this example was repeated, employing a pressure of about 1 mm. of mercury absolute and a temperature slightly below 200° C., the maximum conversion to mercaptan was only 2%.

EXAMPLE 4

A 70 gram sample of dixylyl tetrasulfide, prepared by condensing xylyl mercaptan with sulfur monochloride, was placed in an 125 ml. Claisen flask equipped with an appropriate receiver. Pressure in the system was reduced to 2 mm. of mercury and the flask contents then were heated to 198° C. to initiate distillation. The temperature of the flask contents was increased to a maximum of 226° C. during the 2.5 hours required for the distillation. The distillate weighed 56 grams and analyzed 41 per cent xylyl mercaptan. This represents a conversion to mercaptan of 40 per cent of the tetrasulfide.

EXAMPLE 5

1115 grams of the crude solvent-free reaction products, obtained by condensing 3° xylene with sulfur monochloride in a 10 to 1 mol ratio, was placed in a 2 liter iron pot equipped with a 16 x 1 inch vacuum-jacketed fractionating column packed with glass helices. The column was surmounted by an appropriate distillation head and receiver. Absolute pressure in the system was reduced and maintained between 50 and 100 mm. of mercury. At a pot contents temperature between 220 and 280° C., xylyl mercaptan distilled continuously during a 4.75 hour reaction period. The distillate weighed 515 grams and analyzed 97.4 per cent xylyl mercaptan. This represents a conversion to pure mercaptan of 45 per cent of the crude solvent-free reaction products.

It will be understood that the preceding examples are given for illustrative purposes solely and that our invention is not limited to the specific embodiments disclosed therein. Other di-(methyl substituted phenyl) polysulfides may be substituted for those in the examples. The temperatures and pressure may be varied within the broad ranges hereinbefore disclosed. Also, other apparatus may be used and various forms of apparatus will be readily apparent to those skilled in the art. While the examples show the carrying out of the process in batches, it will be readily apparent that the process may be carried out continuously, with continuous separation and removal of the mercaptans and residues.

It will appear that, by our invention, we have provided a novel process for preparing methyl substituted phenyl mercaptans from their corresponding polysulfides in a simple and economical manner and which produces good yields of quite pure mercaptan. Therefore, it will be apparent that our invention constitutes a valuable contribution to and improvement in the art.

We claim:
1. The method for making methyl substituted phenyl mercaptans which comprises heating at least one di-(methyl substituted phenyl) polysulfide at a temperature of from 200° C. to 350° C. under a pressure below 150 mm. of mercury absolute, and removing the mercaptans from the reaction mass.

2. The method for making methyl substituted phenyl mercaptans which comprises heating at least one di-(methyl substituted phenyl) polysulfide at a temperature of from 200° C. to about 300° C. under a pressure below 150 mm. of mercury absolute, and removing the mercaptans from the reaction mass.

3. The method for making methyl substituted phenyl mercaptans which comprises heating at least one di-(methyl substituted phenyl) polysulfide at a temperature of from 200° C. to 350° C. under a pressure below 100 mm. of mercury absolute, and removing the mercaptans from the reaction mass.

4. The method for making methyl substituted phenyl mercaptans which comprises heating at least one di-(methyl substituted phenyl) polysulfide at a temperature of from 200° C. to about 300° C. under a pressure below 100 mm. of mercury absolute, and removing the mercaptans from the reaction mass.

5. The method for making methyl substituted phenyl mercaptans which comprises heating at least one di-(substituted phenyl) polysulfide in which the substituents on each phenyl radical consist of 1 to 2 methyl radicals at a temperature of from 200° C. to 350° C. under a pressure below 150 mm. of mercury absolute, and removing the mercaptans from the reaction mass.

6. The method for making methyl substituted phenyl mercaptans which comprises heating at least one di-(substituted phenyl) polysulfide in which the substituents on each phenyl radical consist of 1 to 2 methyl radicals at a temperature of from 200° C. to about 300° C. under a pressure below 100 mm. of mercury absolute, and removing the mercaptans from the reaction mass.

7. The method for making xylyl mercaptans which comprises heating at least one dixylyl polysulfide at a temperature of from 200° C. to 350° C. under a pressure below 150 mm. of mercury absolute, and removing the xylyl mercaptans from the reaction mass.

8. The method for making xylyl mercaptans which comprises heating at least one dixylyl polysulfide at a temperature of from 200° C. to about 300° C. under a pressure below 100 mm. of mercury absolute, and removing the xylyl mercaptans from the reaction mass.

9. The method for making xylyl mercaptans which comprises heating a mixture of dixylyl polysulfides at a temperature of from 200° C. to 350° C. under a pressure below 150 mm. of mercury absolute, and removing the xylyl mercaptans from the reaction mass.

10. The method for making xylyl mercaptans which comprises heating a mixture of dixylyl polysulfides at a temperature of from 200° C. to about 300° C. under a pressure below 100 mm. of mercury absolute, and removing the xylyl mercaptans from the reaction mass.

11. The method for making a thiocresol which comprises heating a ditolyl disulfide at a temperature of from 200° C. to 350° C. under a pressure below 150 mm. of mercury absolute, and removing the thiocresol from the reaction mass.

12. The method for making a thiocresol which comprises heating a ditolyl disulfide at a temperature of from 200° C. to about 300° C. under a pressure below 100 mm. of mercury absolute, and removing the thiocresol from the reaction mass.

GEORGE H. DANIELS.
JOHN J. VERBANC.

REFERENCES CITED

The following references are of record in the file of this patent:

UNITED STATES PATENTS

| Number | Name | Date |
|---|---|---|
| 2,506,416 | Gilbert et al. | May 2, 1950 |